United States Patent [19]

Tomlie, Jr.

[11] 4,325,113
[45] Apr. 13, 1982

[54] HIGH VOLTAGE POWER SUPPLY

[75] Inventor: Robert J. Tomlie, Jr., Brookfield Center, Conn.

[73] Assignee: Pitney Bowes Inc., Stamford, Conn.

[21] Appl. No.: 200,663

[22] Filed: Oct. 27, 1980

[51] Int. Cl.³ .............................................. H02M 3/18
[52] U.S. Cl. ............................................. 363/60; 363/26; 363/97
[58] Field of Search ................ 363/26, 37, 41, 59–61, 363/96, 97

[56] References Cited

U.S. PATENT DOCUMENTS

| 3,305,760 | 2/1967 | Davis et al. | 363/60 X |
| 3,412,311 | 11/1968 | Siedband | 363/60 X |
| 4,038,593 | 7/1977 | Quinn | 323/4 |
| 4,042,871 | 8/1977 | Grubbs et al. | 363/61 X |
| 4,042,874 | 8/1977 | Quinn et al. | 323/4 |
| 4,166,690 | 9/1979 | Bacon et al. | 355/3 CH |
| 4,167,777 | 9/1979 | Allington | 363/61 |
| 4,281,374 | 7/1981 | Archer | 363/41 |

Primary Examiner—William M. Shoop
Attorney, Agent, or Firm—Peter Vrahotes; William D. Soltow, Jr.; Albert W. Scribner

[57] ABSTRACT

A high voltage power supply whose output is regulated even though the line voltage input may vary. The power supply comprises essentially a circuit which receives the line voltage and converts it to a square wave form which is supplied to the primary of a step-up transformer. The output of the step-up transformer is directed to a voltage multiplier and feedback unit. The output of the feedback portion of the unit is compared and controlled so that a constant high voltage output is achieved. The balance of the voltage from the multiplier and feedback unit is used to power a load.

6 Claims, 4 Drawing Figures

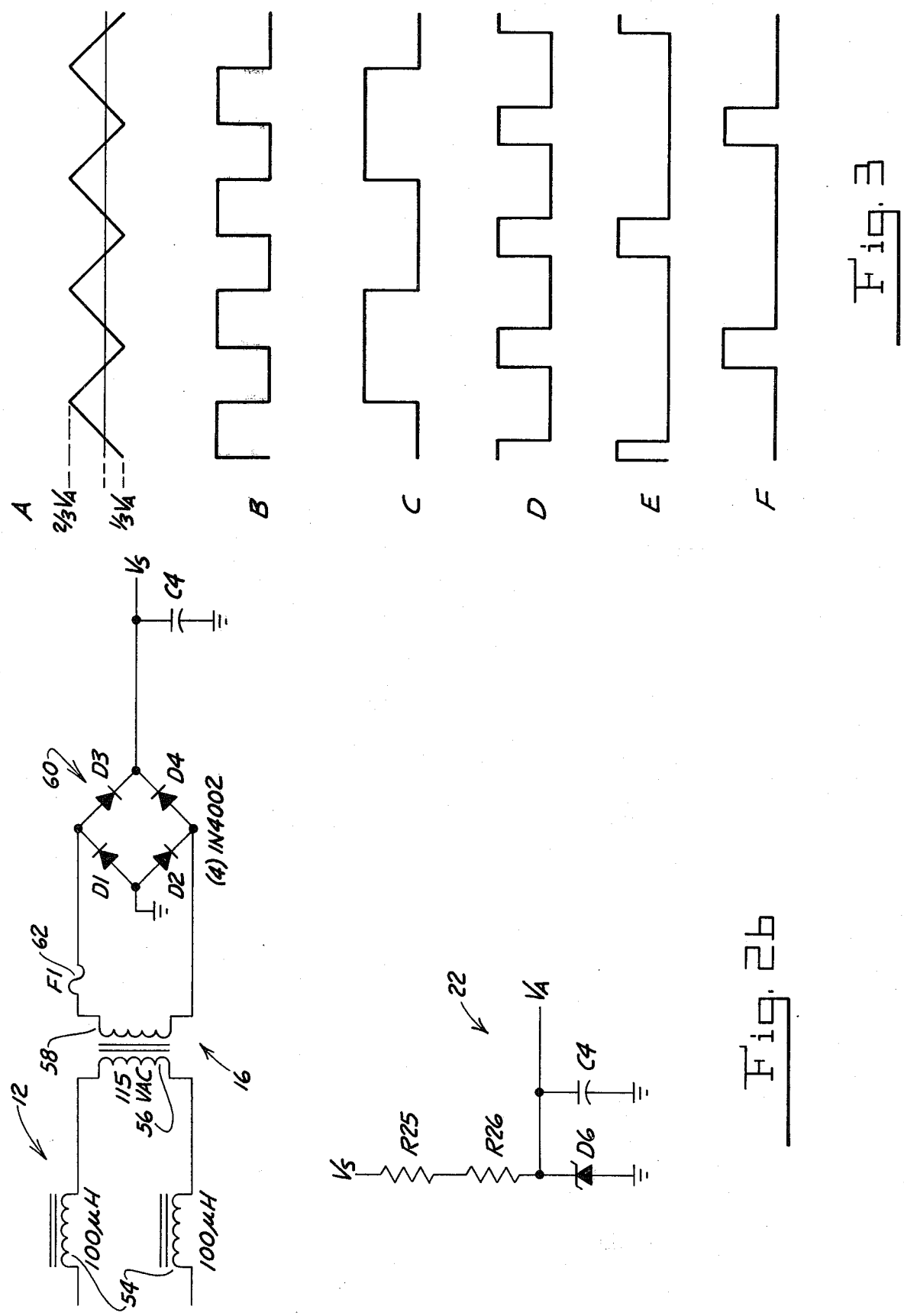

HIGH VOLTAGE POWER SUPPLY

BACKGROUND OF THE INVENTION

High voltage power supplies are used to increase the voltage supplied by the standard 115 or 220 volt line and supply the increased voltage to components or systems such as the corona of a photoelectric copier. Prior high voltage power supplies were of the saturable type which have a number of disadvantages. Among these disadvantages is the fact that such saturable type power supplies are large, expensive and nonadjustable. The power supply of this invention has been fashioned to eliminate the major disadvantages of prior power supplies and, more specifically, to produce a greater voltage at a low current input. The power supply of this invention regulates the voltage supplied to a load at a constant level even though line voltage variation may occur.

SUMMARY OF THE INVENTION

The high voltage power supply of the instant invention includes an ON/OFF control for voltage being supplied from a control logic power unit. The power is supplied to a pair of gates which alternatively drive a pair of drivers whose outputs are connected to the primary of a step-up transformer. The drivers serve the function of controlling the voltage to the primary of the step-up transformer. The output from the transformer is received by a voltage multiplier and feedback divider unit which transmits high voltage to a load and also feeds back a portion of the power to the balance of the power supply. The feedback portion is received by a comparator which compares the feedback voltage to a standard voltage and has provisions that allow adjustments to be made so the output from the comparator will be maintained at a specified voltage level. This output from the comparator is then supplied to a pulse-width modulator that sends a pulse of a controlled width to the pair of gates. An oscillator provides a pulse to an inverter which sends a signal to a flip flop that alternately controls the pair of gates. The signals from the gates alternately control the drivers to supply the controlled voltage to the primary of the step-up transformer.

BRIEF DESCRIPTION OF THE DRAWING

FIG. 2b is a schematic of another portion of the block diagram shown in FIG. 1;

FIG. 3A–3F is a graph showing the form of the pulses at various locations within the circuit shown in FIG. 2a.

DETAILED DESCRIPTION OF THE INVENTION

Figure 1:
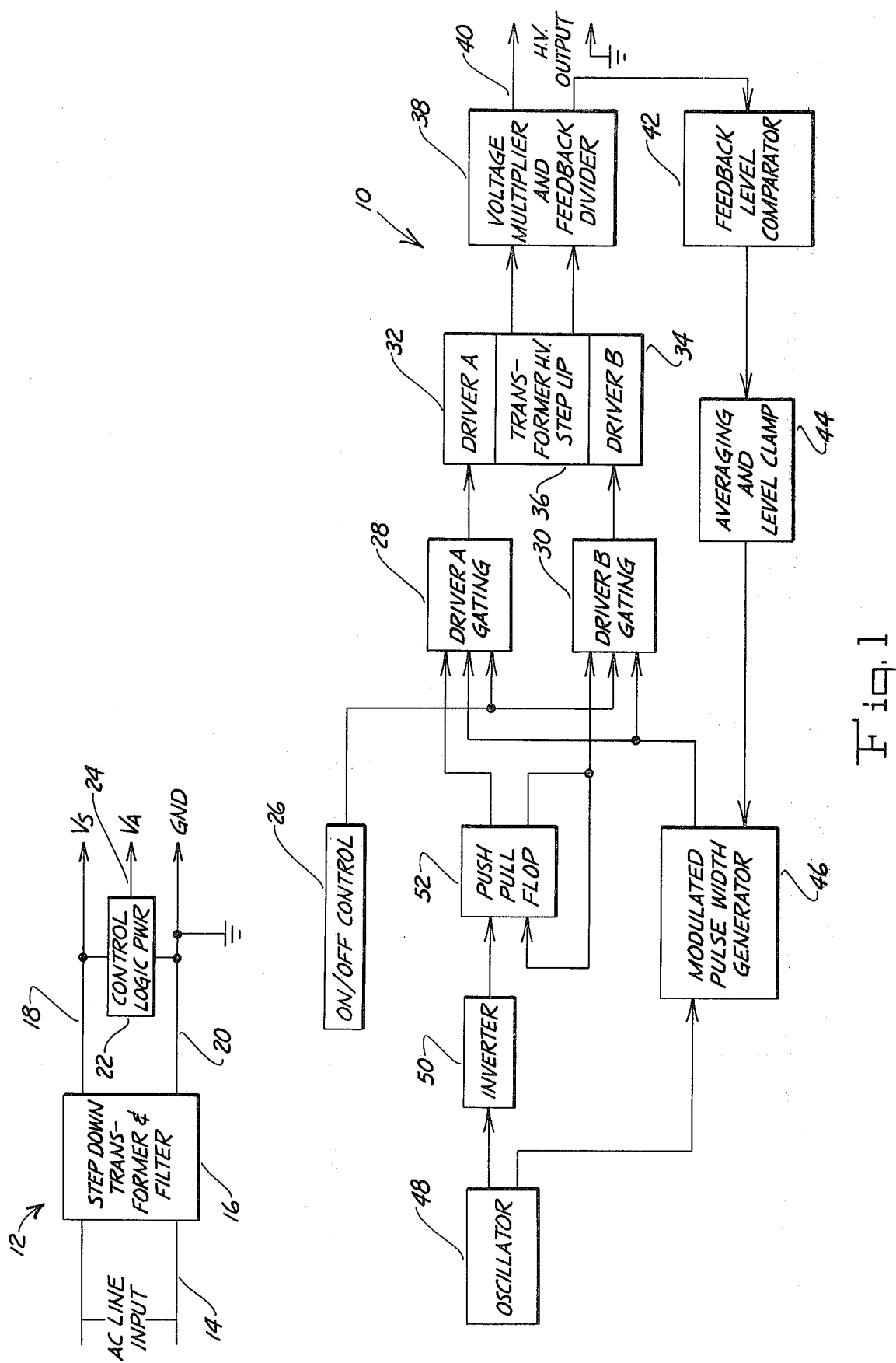
FIG. 1 is a block diagram of a high voltage power supply that incorporates features of the instant invention.

The instant invention will be described initially with reference to the block diagram shown in FIG. 1. The high voltage power supply is shown generally at 10 and includes a power unit shown generally at 12. The power unit 12 includes an AC line input, such as the normal 110 volt, 60 cycle power supply. The power is inputted into a stepdown transformer and filter 16 to obtain an unregulated output voltage $V_s$ that is rectified and filtered. A portion of the voltage $V_s$ is supplied to a control logic power unit 22 that outputs a supply voltage $V_A$ that is regulated at a fixed voltage such as 12 volts. An ON/OFF switch 26 controls the supply voltage $V_A$, and supplies the same to the inputs of a pair of NAND gates 28 and 30. These NAND 28, 30 gates have their output coupled to a pair of drivers 32 and 34, respectively, which in turn have their outputs coupled to the primary of a step-up transformer 36. The output from the transformer 36 is sent to a voltage multiplier and feedback divider 38 which has a load output 40. The load may be a high voltage corona for a copier or any other load requiring high voltage. The output from the voltage multiplier and feedback divider 38 has a portion fed back to a feedback level comparator 44 which compares the feedback voltage to a reference voltage. The output from the feedback level comparator 44 is supplied to a pulse-width generator 46 which modulates the width of a pulse. The generator 46 supplies a pulse to one of the inputs of both of the gates 28, 30. The oscillator 48 inputs a triangular wave form into the generator 46 and also supplies a pulse to a flop 52 through an inverter 50. The push/pull flop 52 in turn provides a signal to the gates 28 and 30 thereby controlling the gates 28, 30 so that one or the other of the drivers 32, 34 is operating but not both at the same time.

Figure 2A:
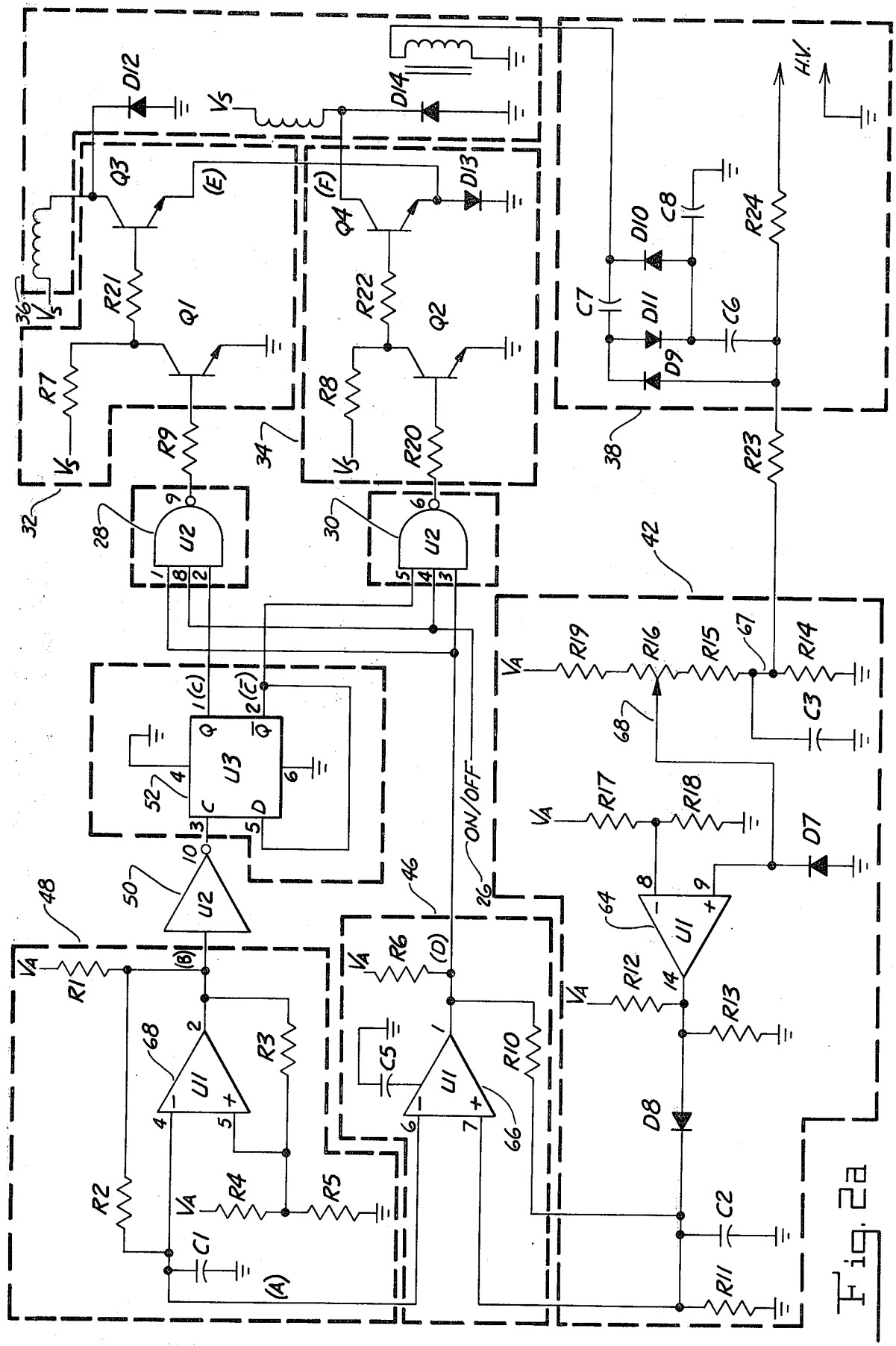
FIG. 2a is a schematic of a portion of the power supply represented by the block diagram shown in FIG. 1.

Referring more specifically to FIGS. 2a, 2b, and 3, the power input 12 includes a pair of inductors 54 that are connected to the AC line input and coupled to the primary 56 of the stepdown transformer 16. The secondary 58 of the transformer is coupled to a bridge 60 for rectification, there being a fuse 62 between the bridge and the secondary. The bridge 60 includes a plurality of diodes D1–D4 and a grounded capacitor C4 for filtering the output. As a consequence, an unregulated voltaage $V_s$ that is rectified and filtered is outputted from the transformer 16. The control logic power 22 includes a pair of resisters R25 and R26, a diode D6 and capacitor C4. This combination will yield a supply voltage $V_A$ whose level of voltage is controlled, as for example at 12 volts. The supply voltage $V_A$ is supplied to an ON/OFF switch 26 which in turn supplies voltage to be inputted to one of three inputs of the NAND gates 28 and 30, and to other components as will be described hereinafter. The output from the gate 28 is supplied to the base of a grounded transistor Q1 through a resistor R9. The transistor Q1 has its collector coupled to the unregulated voltage $V_s$ through a resister R7 and also is coupled to the base of another transistor Q3 through a resister R21. The collector of the transistor Q3 is coupled to the primary of the step-up transformer 36 which primary is also coupled to the unregulated voltage $V_s$. The emitter of the transistor Q3 is coupled to a grounded diode D13. Another grounded transistor Q2 is coupled to the output of the NAND gate 30 through a resister R20. The collector of the transistor Q2 is coupled to the standard voltage $V_s$ through a resister R8 and also coupled to the base of another transistor Q4 through a resister R22. The collector of the transistor Q4 is coupled to the primary of the step-up transformer 36 and the emitter is coupled to the grounded diode D13 as well as to the emitter of the transistor Q3. A pair of grounded diodes D12 and D14 are coupled to the primary of the transformer 36, the diode D12 also being connected to the collector of the transistor Q3.

The voltage multiplier and feedback divider 38 is connected to the secondary of the step-up transformer 36 and includes a plurality of capacitors C6, C7 and C8 which in combination with a pair of diodes D9, D10 and D11 serves to multiply the voltage of the pulse received from the secondary of the step-up transformer 36. The output from the multiplier is then sent to the load through a resister R24, the voltage at this stage being as high as 5,000 volts. The output from the multiplier 38 is also coupled to the level comparator 42 through a resistor R23.

The output from the multiplier 38 is connected to the level comparator 44 through a grounded lead 67 that includes four resistors R14, R15, R16, and R19 in series, resistor R16 being a variable resistor. The lead 67 is also coupled to the supply voltage $V_A$ and to a grounded capacitor C3. The tap 68 to the variable resistor R16 is connected to one input of a comparator 64 and to a grounded diode D7. The other input to the comparator 64 is connected to the supply voltage $V_A$ through a pair of resistors R17 and R18 which are grounded. The output from the comparator 64 is coupled to the supply voltage $V_A$ through a resistor R12 and to ground through a resistor R13. The output from the comparator 64 is rectified by a diode D8 and filtered by a grounded capacitor C2. The filtered output from the comparator 64 is connected to the input of a comparator 66 and to the output of the same comparator through a resistor R10. The comparator 66 is part of the modulated pulse-width generator 46 and has a grounded capacitor C5 coupled thereto. One of the inputs 6 of the comparator 66 is connected to the input 4 of another comparator 68 which forms part of the oscillator 48. The output from the comparator 66 is coupled to the supply voltage $V_A$ through a resistor R6 and is coupled to inputs 1 and 3 of the NAND gates 28, 30 respectively. The other input 5 of the comparator 68 is coupled to the supply voltage $V_A$ through a pair of grounded resistors R4 and R5. The output from the comparator 68 is connected to the supply voltage $V_A$ through a resistor R1 and it is also connected to resistors R2 and R3. The resistor R2 is connected to a grounded capacitor C1 and to one input 4 of the comparator 68. The output from the oscillator 48 goes into an inverter 50 whose output is coupled to the input 3 of a push/pull flip flop 52. The output from the push-pull flip flop 52 is connected to the NAND gates 28 and 30 through inputs 2, 5 respectively.

The oscillator 48 generates a triangular wave voltage, FIG. 3A, at the location (A) in FIG. 2a that varies from approximately one-third to two-thirds of the control logic supply voltage $V_A$. A square wave is generated by the oscillator 48 that is high when the ramp voltage is rising and 0 when it is falling, FIG. 3B and at location (B) in FIG. 2a. The square wave output is inverted by the inverter 50 so that the push/pull flip flop 52 changes state at the start of the falling of the ramp. The flop 52 output, which is gated with two other signals, the ON/OFF control and the modulated pulses, FIG. 3C and locations (C) and (C̄) in FIG. 2a enables the driver 28, then the other driver 30, FIG. 3C, alternatively so that only one of them is enabled at any given time. The drive transistors 32, 34 turn on alternatively for a time equal to the modulated pulse, see FIGS. 3E and 3F and locations (E) and (F) in FIG. 2a. The voltage is stepped-up by the transformer 36, supplied to the voltage multiplier to increase the voltage and at the same time to rectify and filter it. The resulting high voltage output is used as a reference that is input to the resistance network R14, R15, R16 and R19 of the averaging and level clamp 44. The comparator 64 compares a fixed reference at its one input 8 with the voltage at its other input 9. If the voltage of input 9 is greater than the input 8, then there is a zero output. If the reference voltage is less than the voltage at input 9, then the maximum output is outputted by the comparator 64. The maximum output charges the capacitor C2 which will increase the pulse-width when the high voltage output level is less than the voltage at tap 68 from resistor R16. The maximum voltage which sets the maximum pulse width is set by R12 and R13. The voltage represented by the load 70 at capacitor C2, which is connected to input 7 of the comparator 66 is compared against the triangular wave form and gives a pulse that is equal to the time the voltage on capacitor C2, is greater than the voltage on input 6 of the comparator 66, see FIG. 3A. The maximum voltage on capacitor C2 is set to give a pulse-width that limits the maximum power output. The pulse-width modular supply can be adjusted by means of the tap 68 from 0 volts to the maximum achievable by the components used. The comparator 66 output, illustrated by the wave form shown in FIG. 3D, is supplied to the NAND gates 28, 30.

The suggested values for the components shown in FIG. 2a are as follows:

| R1 | 5.1 K | R18 | 20 K |
|---|---|---|---|
| R2 | 130 K | R19 | 100 K |
| R3 | 20 K | R20 | 10 K |
| R4 | 20 K | R21 | 100 ohm |
| R5 | 20 K | R22 | 100 ohm |
| R6 | 20 K | R23 | 100 ohm |
| R7 | 1.2 K | R24 | 10 M |
| R8 | 1.2 K | C0 | 500 μF |
| R9 | 10 K | C1 | 150 PF |
| R10 | 2 M | C2 | .01 PF |
| R11 | 100 K | C3 | 150 PF |
| R12 | 20 K | C4 | 500 μF |
| R13 | 22 K | C5 | 0.01 μF |
| R14 | 100 K | C6 | 0.0012 μF |
| R15 | 240 K | C7 | 0.0012 μF |
| R16 | 0–50 K | C8 | 0.0012 μF |
| R17 | 10 K | | |

What I claim is:

1. A high voltage power supply for supplying voltage to a load, comprising:
   means for receiving a line voltage;
   means for converting the line voltage to a square wave form;
   a step-up transformer having primary and secondary windings;
   means for supplying the square wave form to the primary winding of said transformer;
   means for receiving and multiplying the voltage from said secondary winding;
   means for dividing the voltage from said voltage multiplying means into first and second portions;
   means for supplying said first portion to the load;
   means for comparing the voltage level of said second portion to a fixed voltage, including means for adjusting the voltage level of said second portion in response to said comparison; and
   means for providing said compared voltage of said second portion to said converting means to control the voltage level of the square wave form being supplied to the primary of the transformer.

2. The power supply of claim 1 wherein said first portion is the major portion of the output of said voltage receiving and multiplying means.

3. The power supply of claim 1 wherein said means for converting the line voltage to a square wave form comprises a stepdown transformer connected to said line voltage receiving means, means for filtering and rectifying the output from said transformer to produce a first voltage which is rectified at an unregulated level, control means for receiving a portion of said first voltage to produce a second voltage at a regulated level and an oscillator that receives said second voltage and the output of said means for providing said compared voltage to produce the square wave form.

4. The power supply of claim 3 wherein said means for supplying said square wave form to the primary of said step-up transformer includes an inverter connected to said oscillator to receive said square wave form, a flip flop coupled to said inverter, first and second NAND gates coupled to outputs of said flip flop and to said providing means, a first driver connected to said first NAND gate, a second driver coupled to said second NAND gate, said first and second drivers being connected to the primary of said step-up transformer whereby said flip flop sends square wave signals alternately to said NAND gates which alternately enable said first and second drivers when a signal is received from said providing means.

5. The power supply of claim 4 wherein said comparing and adjusting means is an averaging and level clamp comprising a comparator, a variable resistor connected to one input of said comparator, said variable resistor receiving said second portion, a fixed reference supply connected to a second input of said comparator, the output of said comparator being in connection with said NAND gates.

6. The power supply of claim 5 wherein the output of said comparator is connected to the input of a second comparator and said oscillator is in connection with another input of said second comparator, said oscillator and said second comparator generating a triangular wave form in the connection therebetween, the output of said second comparator being in electrical connection with said NAND gates.

* * * * *